March 14, 1961

R. G. LYALL 2,974,976

AXLE LOAD DISTRIBUTING DEVICE FOR MOTOR
CRANES AND LIKE MOBILE EQUIPMENT

Filed Dec. 12, 1957

INVENTOR.
RALPH G. LYALL

BY

Oberlin & Limbach
ATTORNEYS

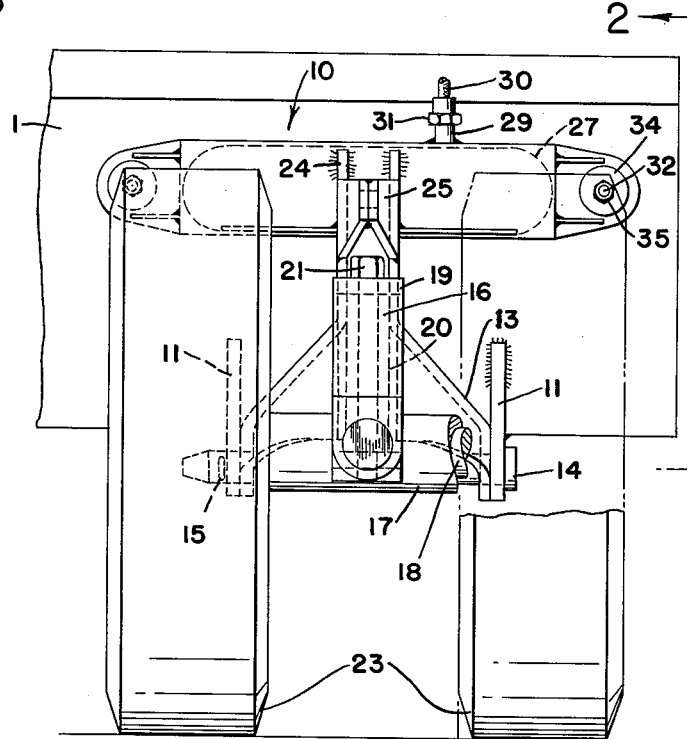

March 14, 1961

R. G. LYALL 2,974,976

AXLE LOAD DISTRIBUTING DEVICE FOR MOTOR
CRANES AND LIKE MOBILE EQUIPMENT

Filed Dec. 12, 1957

INVENTOR.
RALPH G. LYALL

BY

Oberlin & Limbach
ATTORNEYS

United States Patent Office 2,974,976
Patented Mar. 14, 1961

2,974,976
AXLE LOAD DISTRIBUTING DEVICE FOR MOTOR CRANES AND LIKE MOBILE EQUIPMENT

Ralph G. Lyall, 3715 W. Monroe, Seattle, Wash.

Filed Dec. 12, 1957, Ser. No. 702,281

6 Claims. (Cl. 280—124)

The present invention relates generally as indicated to an axle load distributor for motor cranes and like mobile equipment, the device herein having been appropriately referred to as a "crane crutch" by virtue of its function to distribute axle loads on such equipment, and more particularly, to reduce rear axle loads over which the heavy components of the equipment usually are carried.

Heretofore, owners or users of heavy mobile equipment have experienced considerable difficulties with reference to highway travel thereof owing to the necessity of securing special permits from State or local authorities for such travel, and in the case of the larger, heavier pieces of equipment such special permission for highway travel has been denied altogether. If no highway travel permit can be obtained the only alternative has been to separately ship the heavy components to the place of use and there assemble them on the mobile equipment. For mining or like heavy equipment this may not be a serious drawback or inconvenience, because such equipment usually is intended to be used indefinitely at the same site. However, as to heavy mobile equipment that must be from time to time moved from one place to another, the assembly and disassembly of the heavy components may prove to be a costly and time-consuming proposition. Another alternative in order to meet highway axle load limits would be to install extra axles on the vehicle frame, but again, this is expensive and wasteful since the existing tandem rear axles are more than adequate to safely support the equipment under the loads encountered in the normal intended use of the equipment.

Accordingly, the following are a few of the principal objectives of this invention, the same being enumerated below without regard to their relative importance and without intending that the following list be all-inclusive of the various features or objects of this invention:

(1) To provide an axle load distributor which is simple and inexpensive in design, and in addition, is of lightweight construction;

(2) To provide an axle load distributor which can be attached to and removed from the mobile equipment with which it is used in a matter of a few minutes time to distribute axle loads (when attached) for highway travel and to enable use of the equipment (when detached) in its normal manner, and in the case of motor cranes, for example, the axle load distributor herein is designed to be lifted into and out of place by the crane hook so as not to require any auxiliary handling equipment for the distributor;

(3) To provide an axle load distributor which, in effect, constitutes a detachable rearward extension of the vehicle frame and which has a ground engaging wheel that tends to raise the vehicle frame about the front axle to thereby lessen the rear axle load, or stated in another way, the distributor herein transfers added load on the front axle to thereby lessen the rear axle load;

(4) To provide an axle load distributor that is readily adjustable to vary the pressure of its ground-engaging wheel with the ground to thereby effect an adjustable redistribution of the vehicle axle loads;

(5) To provide an axle load distributor which includes a ground-engaging wheel which has a swivel or caster mounting for turning about a generally vertical axis to thereby facilitate travel of the equipment along curved or winding highways;

(6) To provide an axle load distributor which is capable of maintaining a substantially constant pressure engagement of its wheel with the ground even on rough or hilly highways;

(7) To provide an axle load distributor which has a caster-mounted ground-engaging wheel which turns easily at a slow rate but yet is prevented from "castering" or wobbling as the equipment travels along the highway;

(8) To provide an axle load distributor in which the ground-engaging wheel of the distributor is mounted for downward swinging about a generally horizontally disposed axis to its ground-engaging position;

(9) To provide an axle load distributor in combination with mobile equipment which includes a plurality of ground-engaging wheels that are transversely spaced apart a distance corresponding approximately with the spacing apart of the frame-supporting wheels that are mounted on the vehicle axles;

(10) To provide an axle load distributor which includes a pair of wheel carriers with each carrier having a pair of ground-engaging wheels.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 3 is an elevation view as viewed from the left-hand side of Fig. 2;

Fig. 4 is a view similar to Fig. 2 except illustrating another embodiment to resist free wobbling of the distributor wheels about their vertical swivel or caster mount;

Figures 1, 2:
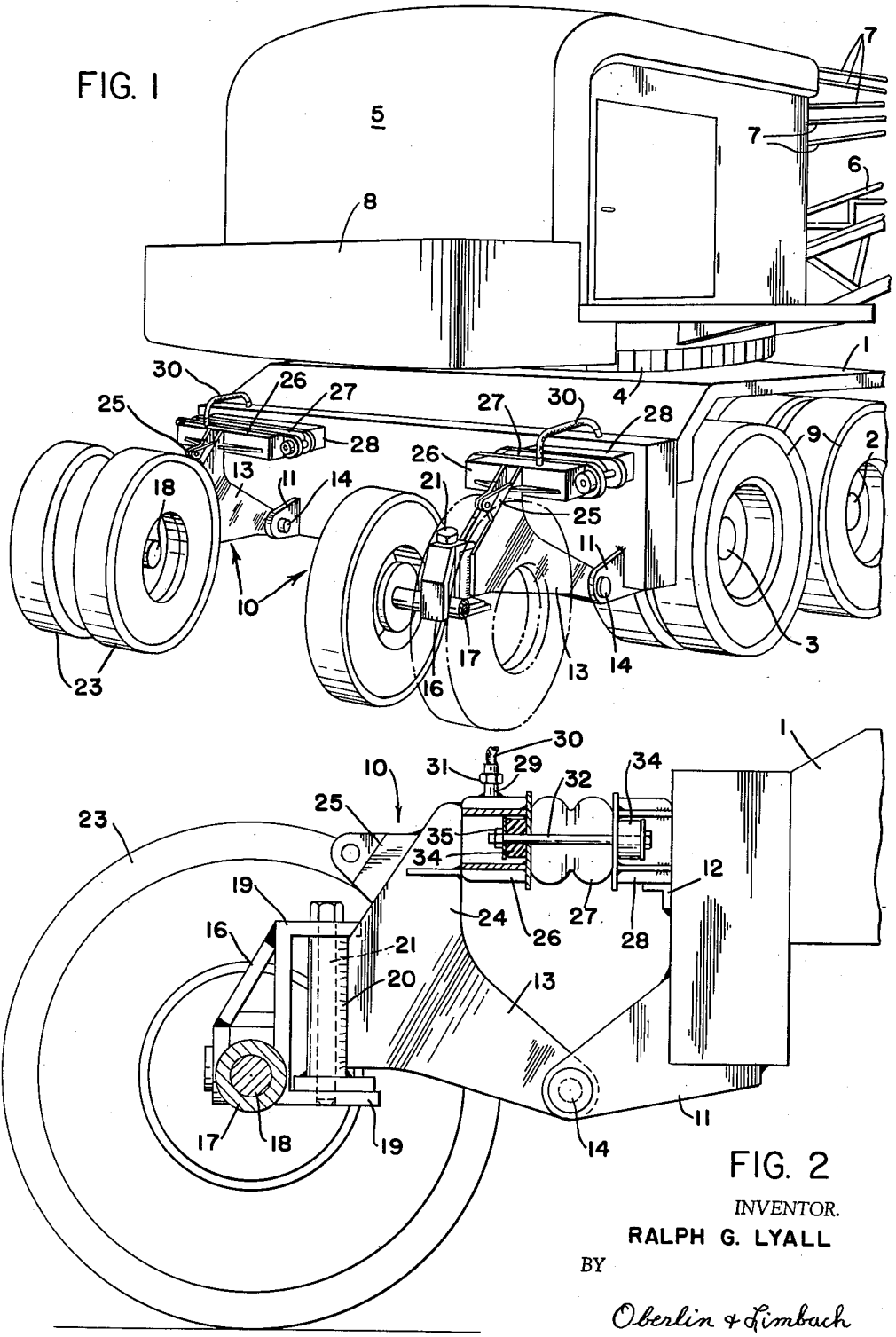
Fig. 1 is a perspective view of the rear portion of a motor crane having the axle load distributor assembly of the present invention secured at the rear end of the frame of said motor crane.
Fig. 2 is a side elevation view, on somewhat enlarged scale, as viewed from the right-hand side of the motor crane as viewed in Fig. 1, the outboard wheel of the distributor having been removed and the axle being in section so as to clearly show how the distributor is attached to the rear end of the vehicle frame.

Referring now in detail to the drawings and first to Figs. 1 to 3, the mobile equipment herein shown for purposes of illustration only is a motor crane which comprises a longitudinally extending frame 1 that is supported by a front axle, not shown, and by tandem rear axles 2 and 3. As is customary in this type of equipment there will be mounted over the front portion of the frame and over the front axle the usual cab for the driver of the vehicle. Mounted on the frame 1 over the tandem rear axles 2 and 3 is the turntable 4 on which, in turn, the crane cab 5 is mounted. The foot of the crane boom 6 is pivotally connected for swinging in a vertical plane at the base of the crane cab mounting. The reference numerals 7 denote the conventional lines for raising and lowering the boom 6 and for raising and lowering the crane hook, bucket, or other load handling device that hangs from the tip of the boom 6. Also mounted on the turntable 4, or on the crane cab 5, is the usual heavy counterweight 8 which enables the picking up of heavy loads at the tip of the boom 6 without causing tipping of the vehicle frame 1. It is to be understood that outriggers (not shown) will usually be used in connection with this type of equipment to prevent transmission of excessive loads on the axles 2 and 3 and dual wheels 9 thereof.

As previously mentioned, it has been necessary in connection with highway travel of equipment of this nature either to secure special permission for such travel, or else, in the case of the heavier pieces of equipment, where such permission is not granted, to remove the counterweight 8 and/or any other heavy components of the equipment for shipment separately to the site at which the equipment is to be used.

However, with the present invention the axle loads of the equipment are redistributed so as to be within permissible limits so that no such disassembly and separate shipment is required.

In the present case, a pair of axle load distributors 10 are detachably secured to the rear end of the vehicle frame 1 in transversely spaced apart relation corresponding approximately with the transverse spacing of the wheels 9 mounted at the ends of the tandem rear axles 2 and 3. Because both distributors 10 are of the same construction only one will now be described in detail.

In the embodiment of the invention shown in Figs. 1, 2 and 3, the rear end of the vehicle frame adjacent each end has welded or otherwise secured thereto, a pair of brackets 11, 11 and an angle 12 that constitutes a locating shelf for a part of the distributor 10 as hereinafter described.

The articulated wheel carrier assembly of the distributor 10 comprises a first part 13 which is swingably secured to the paired brackets 11 as by means of the removable pin 14, the pin being held against accidental withdrawal as by retainer 15; and a second part 16 which is provided with a housing 17 for the axle 18 and with a clevis 19 through which, and king pin housing 20, the king pin 21 extends. Accordingly, the wheel carrier assembly of the distributor 10 is bodily swingable about the horizontal axis of the hinge pin 14, and the wheels 23 that are mounted at the ends of the axle 18 are capable of turning about the vertical axis of the king pin 21.

Said first part 13 is also formed with an upright portion 24 having an apertured bracket 25 by which the distributor may be conveniently handled, said upright portion being spaced rearwardly of the frame 1 and having welded thereto the head 26 of the distributor actuator 27, the opposite head 28 being adapted to abut the frame end above the shelf 12. The actuator 27 herein shown is in the form of an air bag of cord-reinforced rubber-like material which is bonded or otherwise secured to the respective heads 26 and 28 and is provided with a stem 29 for connection with an air pressure hose 30, the hose 30 and stem 29 carrying the complemental elements of a quick disconnect coupling 31 so that once the pin 14 is installed, the air hose 30 may be quickly connected in place for inflation of said air bag 27. As evident when the air bag 27 is inflated, the head 28 will abut the end of the frame 1 and the resulting rearward movement of head 26 will cause the wheels 23 to be pressed against the ground to exert a lifting force on the frame 1 through the pin 14, such lifting force being proportional to the air pressure in the bag 27. Although, the front axle load may increase due to such lifting tendency of the rear end of the frame 1 the increased front axle load will yet be well within permissible limits. Each head 26 and 28 is formed with openings adjacent its opposite ends through which extend the bolts 32 with rubber bumpers 34 interposed between the heads of said bolts and the nuts 35 to lessen shock loads and to limit the extent of expansion of the actuator 27.

Figure 6:
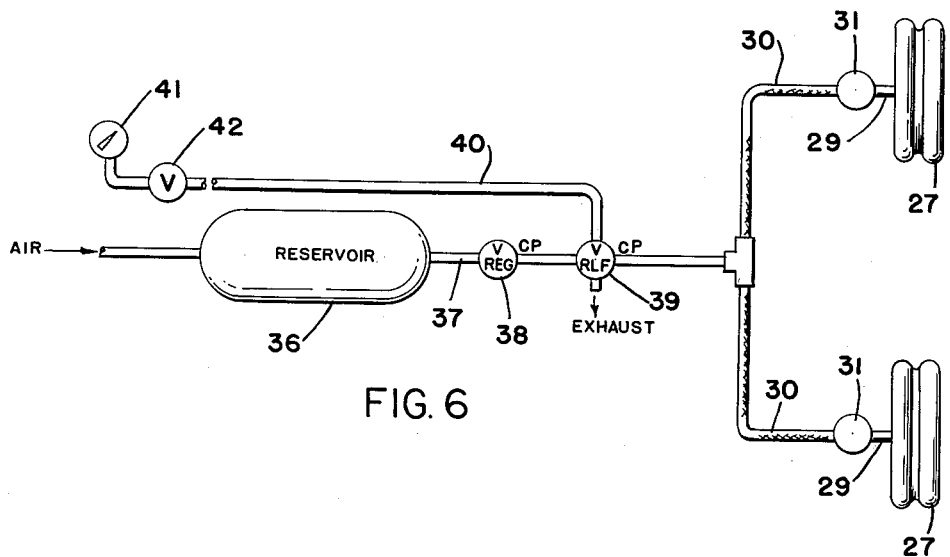
Fig. 6 is a schematic piping diagram showing how the axle load distributor may be controlled at will to effect desired redistribution of axle loads of the motor crane or other mobile equipment to which the distributor is secured.

In Fig. 6 there is shown a schematic piping diagram showing how the air pressure supplied to the actuators 27 through the hoses 30 may be varied and how the pressure can be maintained at a selected value despite movement of the wheels 23 up or down with respect to the wheels 9. In this way, the redistributed axle loads may be maintained substantially constant, even though the vehicle travels over rough or hilly terrain. Thus, even though the vehicle frame 1 levels off after having reached the top or bottom of a hill, while the distributor wheels 23 are yet moving uphill or downhill, the distributors 10 will continue to function as desired. This arrangement also takes care of the problem of the vehicle starting to go uphill or downhill while yet the distributor wheels 23 are traveling on level ground. In any one of these instances, the effect of the distributors 10 on the axle loads would remain approximately constant to best serve the purposes of the invention.

Referring yet to Fig. 6, the mobile equipment will be provided with an engine operated air compressor, not shown, to supply compressed air into the supply tank 36. In the line 37 between the supply tank 36 and the respective actuators 27 there is installed a pressure regulating valve 38 which controls the pressure of the air that is supplied to the actuators 27 through the hoses 30. There is also installed in air pressure line 37 an adjustable bleeder or relief valve 39 which prevents the building up of pressure in the actuators 27 when the wheels 23 swing upwardly or clockwise, as viewed in Fig. 2. Also connected to the bleeder valve 39 or elsewhere in the pressure supply line, is a line 40 to which a suitable air pressure gauge 41 is connected, there being a shutoff valve 42 adjacent the gauge 41 whereby the gauge is protected from shock. The valves 38, 39, and 42 and the gauge 41 will be disposed in the driver's cab or other convenient place and when the proper adjustments have been made the valve 42 may be closed to protect the gauge 41. If desired, the stems 29 may be equipped with check valves should it be desired to dispense with the piping system. In that case, the actuators 27 may be inflated to the desired pressure by a hand pump or the like.

Figure 5:
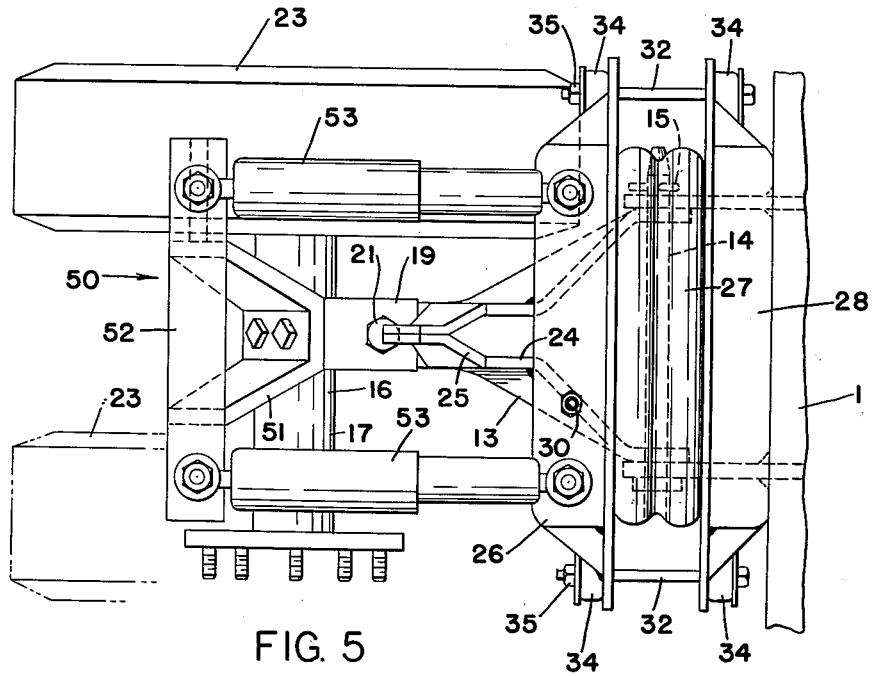
Fig. 5 is a top plan view of the axle load distributor illustrated in Fig. 4.

The form of the axle load distributor 50 illustrated in Figs. 4 and 5 is basically the same as the distributor 10 just described (same numerals used for the same parts) except for the provision of an extra bracket 51 for a horizontally extending bar 52 to which the rear ends of a pair of hydraulic shock absorbers 53 or the like are secured. The front ends of said horizontally extending and parallel shock absorbers 53 are secured to the head 26 of the actuator 27. As evident, these shock absorbers 53 permit the distributor wheels 23 to freely turn (at a slow rate) about the vertical king pin 21 but resist free rapid turning of the wheels 23 and therefore, wobbling or "castering" is prevented as the equipment travels along the highway.

It can be seen from the foregoing description that all that it is necessary to do in order to attach the distributors 10 or 50 is to lift the same to approximately the correct position with heads 28 resting on the respective shelves 12, to insert the pins 14 and retainers 16, and to couple the free ends of the hoses 30 to the stems 29 of the air bags 27. Obviously, such attaching operation can be done in a matter of a minute or so. Similarly, the removal of the distributors 10 or 50 is a simple and quick operation requiring merely the detachment of the hoses 30 and pulling of the pins 14 whereupon the distributors 10 or 50 may be lifted away for use on another piece of equipment which it is desired to move to another site over a highway. As previously mentioned, the attachment and detachment of the air hoses 30 is greatly facilitated by providing quick disconnect couplings 31 at the ends of the stems 29 and hoses 30.

Other modes of applying the principle of the invention may be employed, change being made as regards the details described, provided the features stated in any of the following claims, or the equivalent of such, be employed.

I therefore particularly point out and distinctly claim as my invention:

1. An axle load distributing device for a motor crane and like equipment that has a frame supported on axles equipped with ground engaging wheels, comprising a bracket on the rear end of said frame, a wheel carrier having a ground-engaging wheel whose axis is rearward of said bracket, said carrier further having forwardly inclined and upwardly extending portions, a generally horizontally extending pin detachably connecting said forwardly inclined extending portion of said carrier to said bracket for swinging of said carrier about said pin, and a generally horizontally forwardly resiliently extensible head mounted on said upwardly extending portion of said carrier and disposed, when extended, to bear against the rear end of said frame at a region spaced above said bracket and to swing said carrier about said pin in a direction to move said wheel down to ground-engaging position.

2. The device of claim 1 wherein said head is actuated by a rubber-like air bag which, when inflated, expands and bears against the upwardly extending portion of said carrier resiliently to force said head against the rear end of said frame thus to move said carrier about said pin.

3. The device of claim 1 wherein said frame has a locating shelf upon which the front portion of said head is adapted to rest as when said device is being connected by said pin to said bracket.

4. An axle load distributing device for a motor crane and like mobile equipment that has a frame supported on axles equipped with ground-engaging wheels; comprising a wheel carrier having a ground-engaging wheel, the axis of said wheel being positioned on one end of said carrier, the opposite end of said carrier comprising an upper and lower portion, the lower portion being pivotally connected to said frame by a generally horizontally extending removable pin, said upper portion including a resiliently extensible horizontally extending head adapted to bear against said frame and when extended, pivoting said wheel about said pin to force said wheel against the ground.

5. An axle load distributing device as set forth in claim 4 wherein said resiliently extensible head is actuated by an inflatable air bag positioned between said upper portion of said carrier and said extensible head thereby resiliently to move said extensible head with respect to said carrier, said head being connected to said carrier by bumpers on each side thereof to limit the extent of expansion of said air bag, and means adapted to connect said inflatable air bag to a regulatable source of air under pressure on such motor crane and like mobile equipment thereby to inflate said air bag.

6. An axle load distributing device as set forth in claim 5 in which said ground-engaging wheel has a swivel mounting for turning about a generally vertical axis thereby to facilitate travel of said equipment along curved highways, and wobble dampening means connecting said ground-engaging wheel to said upper portion of said wheel carrier thereby to prevent castering of said ground-engaging wheel while enabling said wheel to turn easily at a slow rate.

References Cited in the file of this patent
UNITED STATES PATENTS

| | | |
|---|---|---|
| 2,229,723 | Burger | Jan. 28, 1941 |
| 2,440,502 | Etgen | Apr. 27, 1948 |
| 2,502,309 | Byrd | Mar. 28, 1950 |
| 2,529,159 | Hyler | Nov. 7, 1950 |
| 2,760,784 | Talbert | Aug. 28, 1956 |
| 2,815,223 | Wharton | Dec. 3, 1957 |
| 2,820,647 | Jackson | Jan. 21, 1958 |
| 2,879,077 | Chalmers | Mar. 24, 1959 |

FOREIGN PATENTS

| | | |
|---|---|---|
| 111,646 | Sweden | Aug. 29, 1944 |